United States Patent
Campbell

(10) Patent No.: US 12,330,814 B2
(45) Date of Patent: Jun. 17, 2025

(54) METHOD AND APPARATUS FOR AUTOMATED DE-ICING OF AIRCRAFT

(71) Applicant: JCAI Inc., Mississauga (CA)

(72) Inventor: Jeffery Paul Campbell, Cambridge (CA)

(73) Assignee: JCAI Inc., Mississauga (CA)

( * ) Notice: Subject to any disclaimer, the term of this patent is extended or adjusted under 35 U.S.C. 154(b) by 646 days.

(21) Appl. No.: 17/288,137

(22) PCT Filed: Oct. 23, 2019

(86) PCT No.: PCT/CA2019/051506
§ 371 (c)(1),
(2) Date: Apr. 23, 2021

(87) PCT Pub. No.: WO2020/082180
PCT Pub. Date: Apr. 30, 2020

(65) Prior Publication Data
US 2021/0380280 A1    Dec. 9, 2021

Related U.S. Application Data

(60) Provisional application No. 62/749,185, filed on Oct. 23, 2018.

(51) Int. Cl.
*B05B 1/20* (2006.01)
*B05B 9/00* (2006.01)
(Continued)

(52) U.S. Cl.
CPC .................. *B64F 5/23* (2017.01); *B05B 1/20* (2013.01); *B05B 9/002* (2013.01); *B05B 9/007* (2013.01);
(Continued)

(58) Field of Classification Search
None
See application file for complete search history.

(56) References Cited

U.S. PATENT DOCUMENTS 3,612,075 A    10/1971  Cook
5,180,122 A     1/1993  Christian et al.
(Continued)

FOREIGN PATENT DOCUMENTS

EP    2454156 A1    5/2012
GB    2166697 A     5/1986
(Continued)

OTHER PUBLICATIONS

Mäkelä, "Developing of Aircraft De-Icing Operations At Helsinki Airport", May 31, 2010, downloaded Jul. 7, 2015 from https://publications.theseus.fi/bitstream/handle/10024/16632/THESIS READY MIKKO MAKELA.pdf.
(Continued)

*Primary Examiner* — Levon J Shahinian
(74) *Attorney, Agent, or Firm* — Gowling WLG (Canada) LLP

(57) ABSTRACT

A system for automated de-icing or contamination removal of an aircraft. The system includes a mobile platform, the mobile platform including a set of wheels and a swerve drive for controlling movement of the set of wheels along with a contamination removal apparatus mounted to the mobile platform for delivering contamination removal treatment to the aircraft. The system also includes a processor for receiving instructions associated with the contamination removal treatment from an external party and for controlling the mobile platform and contamination apparatus to deliver the contamination removal treatment.

14 Claims, 11 Drawing Sheets

(51) Int. Cl.
  *B05B 12/12* (2006.01)
  *B05B 12/16* (2018.01)
  *B05B 13/00* (2006.01)
  *B08B 3/02* (2006.01)
  *B08B 3/08* (2006.01)
  *B08B 5/02* (2006.01)
  *B08B 13/00* (2006.01)
  *B64F 5/23* (2017.01)

(52) U.S. Cl.
  CPC .............. *B05B 12/12* (2013.01); *B05B 12/16* (2018.02); *B05B 13/005* (2013.01); *B08B 3/024* (2013.01); *B08B 3/08* (2013.01); *B08B 5/02* (2013.01); *B08B 13/00* (2013.01)

(56) References Cited

U.S. PATENT DOCUMENTS

| | | | |
|---|---|---|---|
| 6,092,765 | A | 7/2000 | White |
| 6,636,581 | B2 | 10/2003 | Sorenson |
| 7,069,121 | B1 | 6/2006 | Cummings, Jr. et al. |
| 7,725,410 | B2 | 5/2010 | Lee |
| 8,571,747 | B2 | 10/2013 | Zimpfer et al. |
| 8,982,207 | B2 | 3/2015 | Jang |
| 9,031,311 | B2 | 5/2015 | Tillotson |
| 2003/0043964 | A1 | 3/2003 | Sorenson |
| 2005/0090969 | A1 | 4/2005 | Siok et al. |
| 2011/0266393 | A1 | 11/2011 | Liczbinski |
| 2012/0153032 | A1* | 6/2012 | Svanebjerg ............... B64F 5/23 239/1 |
| 2013/0073419 | A1 | 3/2013 | Marwedel et al. |
| 2015/0298826 | A1 | 10/2015 | Luca |
| 2015/0336121 | A1 | 11/2015 | Randa |
| 2018/0105276 | A1 | 4/2018 | Wilkins |
| 2018/0143634 | A1 | 5/2018 | Ott et al. |

FOREIGN PATENT DOCUMENTS

| | | |
|---|---|---|
| GB | 2391799 A | 2/2004 |
| KR | 101179519 | 8/2012 |
| WO | 93/00261 A1 | 1/1993 |
| WO | 2017/214686 A1 | 12/2017 |

OTHER PUBLICATIONS

Mitteldeutsche Airport Holding, "Aircraft De-icing at Leipzig/Halle Airport—Standard Deicing Setup", Aug. 21, 2012, downloaded May 7, 2015 from https://www.leipzig-halle-airport.de/mediapool/standard_deicing_setup_rev_04_vom_21-08-2012.pdf.

International Search Report from corresponding International Application PCT/CA2019/051506 dated Jan. 2, 2020.

Notification of Reason for Refusal for the corresponding Japanese Application No. 2021-523222 dated Jun. 20, 2023.

The European Search Report for the corresponding EP Application No. 19877128.9 dated Jun. 10, 2022.

* cited by examiner

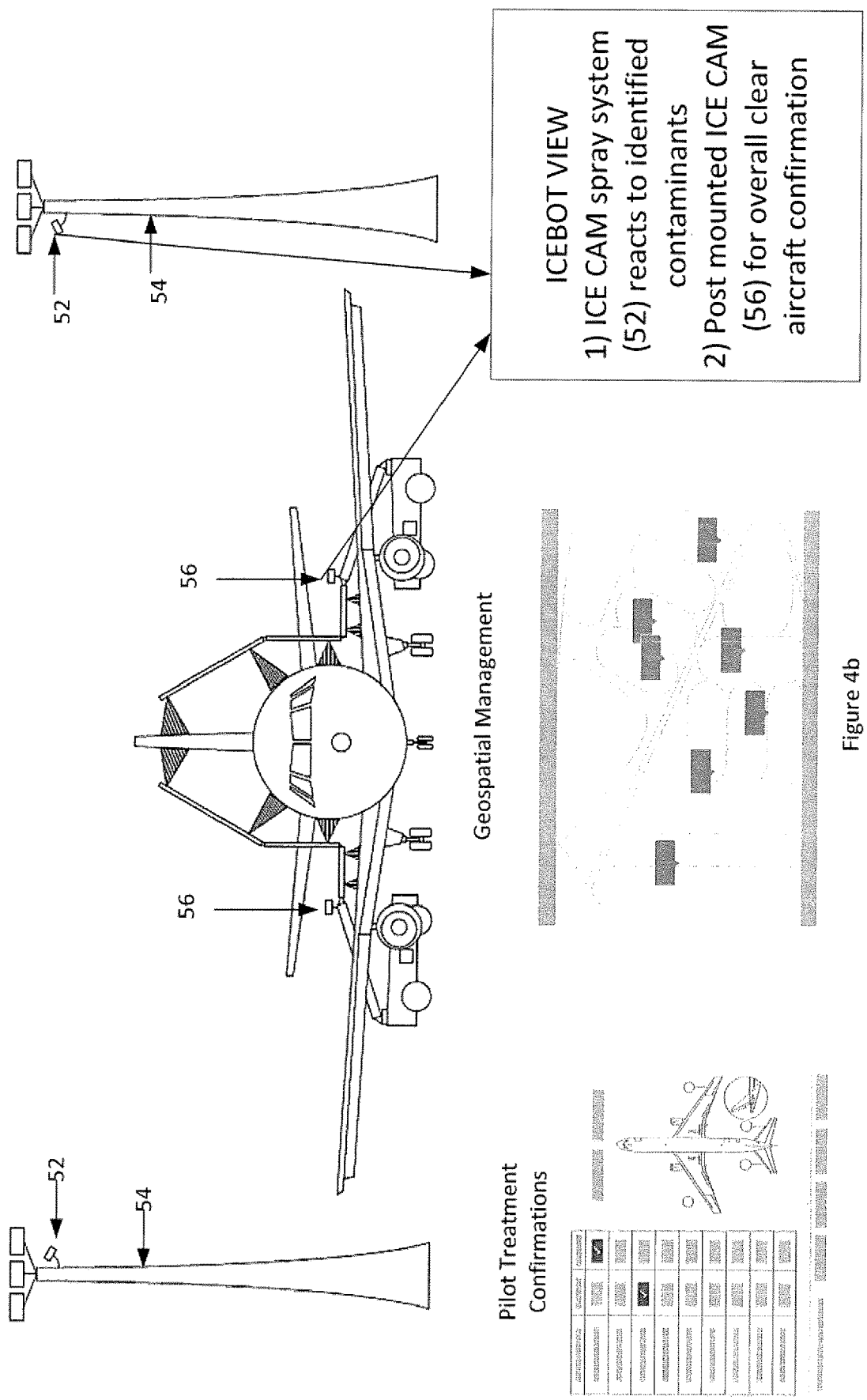

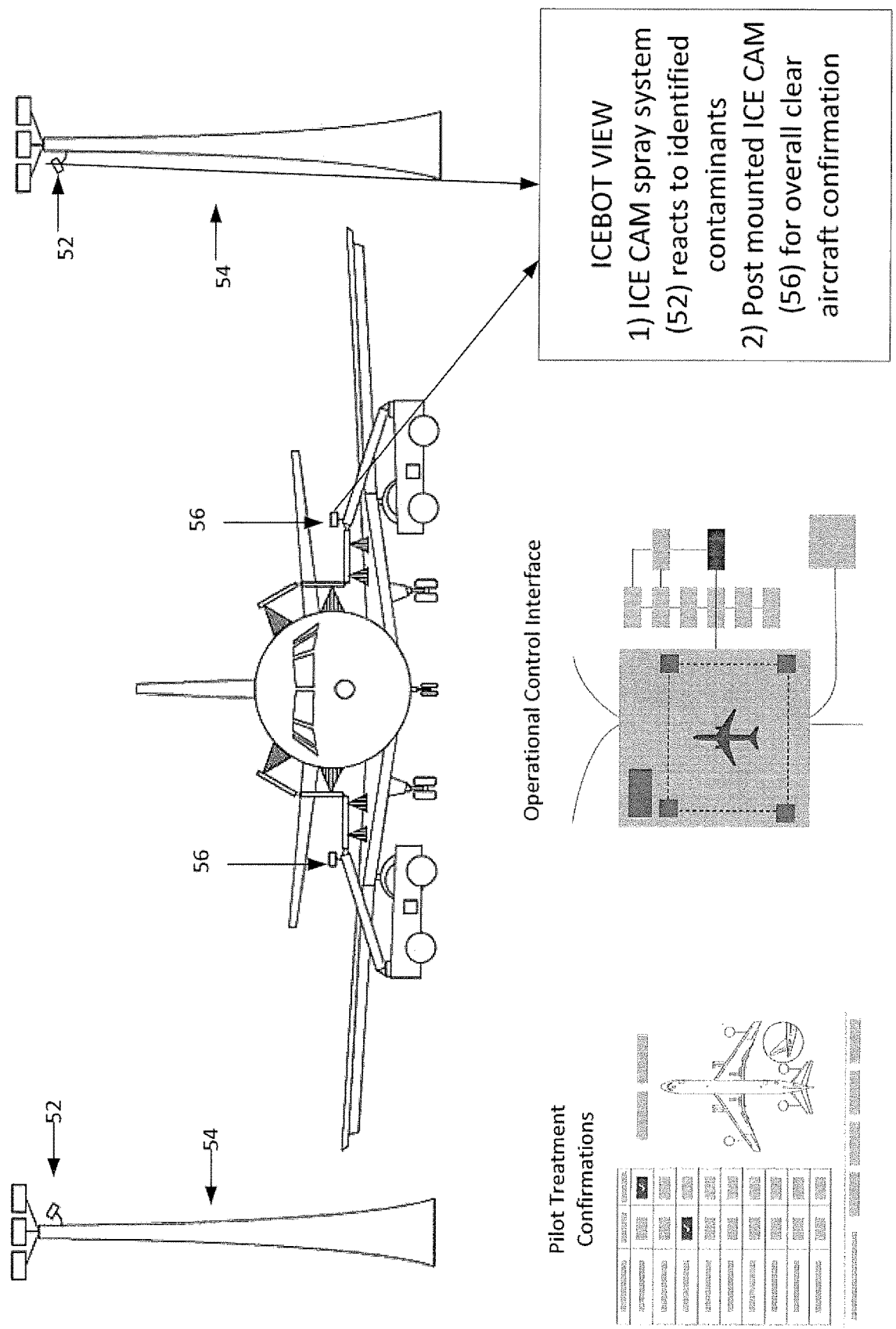

METHOD AND APPARATUS FOR AUTOMATED DE-ICING OF AIRCRAFT

CROSS-REFERENCE TO OTHER APPLICATIONS

The application claims priority from U.S. Provisional Application No. 62/749,185 filed Oct. 23, 2018 which is hereby incorporated by reference.

FIELD

The disclosure is generally directed at aircraft, and more specifically, at a method and apparatus for automating the de-icing process for an aircraft.

SUMMARY

Airport and airline de-icing management for decision making, marshalling, spraying, inspection, scheduling and provisioning of the radio direction finder (RDF) are for the most part manual. Some advanced information systems are used to reduce manual involvement and costs. However, this only partially mitigates or reduces the risks and shortcomings of the system, with human performance the single most critical and difficult part of process, leading to serious breakdowns and delays to winter flight schedules. The method and apparatus of the disclosure overcomes at least one of these disadvantages.

The apparatus may be seen as including two different innovations. A first innovation may be seen as a drive platform, which may also be described as an autonomous mobile platform (AMP), and a second innovation may be seen as the integration of a set of spray arms (for delivering de-icing fluid) with the AMP.

In one embodiment, the AMP is multi-wheeled chassis that can navigate and traverse throughout the aerodrome (or airport) autonomously or under remote control. In another embodiment, the set of spray arms that are integrated with the AMP is built to carry out a specific task, which in the current embodiment, is to deliver the de-icing fluid. In another embodiment, the set of spray arms may be used to apply other fluids to aircraft.

In an aspect of the disclosure, there is provided a system for automated de-icing of an aircraft including a mobile platform, the mobile platform including a set of wheels and a swerve drive for controlling movement of the set of wheels; a contamination removal apparatus mounted to the mobile platform for delivering contamination removal treatment to the aircraft; and; a processor for receiving instructions associated with the contamination removal treatment from an external party and for controlling the mobile platform and contamination removal apparatus to deliver the contamination removal treatment.

In another aspect, the contamination removal apparatus includes a crane am portion; and at least one spray arm portion. In an aspect, the crane arm portion is mounted to the mobile platform and the at least one spray arm portion is pivotally connected to the crane arm portion. In yet another aspect, the at least one spray arm portion includes an upper spray arm portion and a lower spray arm portion.

In another aspect, the upper spray arm portion is pivotally connected to the lower spray arm portion. In a further aspect, each of the upper spray arm portion and the lower spray arm portion comprise nozzles to deliver de-icing fluid or compressed gas to the aircraft. In another aspect, the system further includes set of sensor for determining environmental conditions and for communicating the environmental conditions to the processor. In yet another aspect, the system includes a set of LEDs for indicating operational status and/or event status of the system. In another aspect, the nozzle individually articulates in axes parallel and perpendicular to the spray arm portion to which it is attached.

DESCRIPTION OF THE DRAWINGS

Embodiments of the present disclosure will now be described, by way of example only, with reference to the attached Figures.

FIGS. 4a to 4c are further schematic views of a system for automated de-icing of an aircraft;

DETAILED DESCRIPTION

The disclosure is directed at a method and system for automating the de-icing of an aircraft. In one embodiment, the system may be seen as a mobile de-icing machine that includes a mobile platform (which may be seen as a swerve platform or an autonomous mobile platform) which enables the system to move around an airport to get from a starting location to a de-icing location. In one embodiment, the starting location may be where the de-icing machine is located and the de-icing location is where the aircraft that needs de-icing is located.

During operation, the system may traverse the outline of the aircraft to apply or spray the de-icing fluid on the fuselage and tail (and other parts) of the aircraft in a continuous motion. The mobile platform preferably includes a set of wheels that are able to swerve whereby the mobile platform may also be seen as a swerve drive platform. In one embodiment, this allows the apparatus to pivot 90 degrees without having to move from a stationary position.

In another embodiment of the disclosure, the system includes a swerve drive platform and a dedicated/dynamic de-icing fluid and/or compressed gas spray system. The apparatus may further include ice detection camera technology for monitoring the de-icing process or for assisting in determining where de-icing is required. The apparatus is preferably integrated as part of an overall de-icing management system that is able to provide at least, but is not limited to, job identification information, location information, aircraft type information, fluid monitoring information and/or pilot management information.

Figure 1:
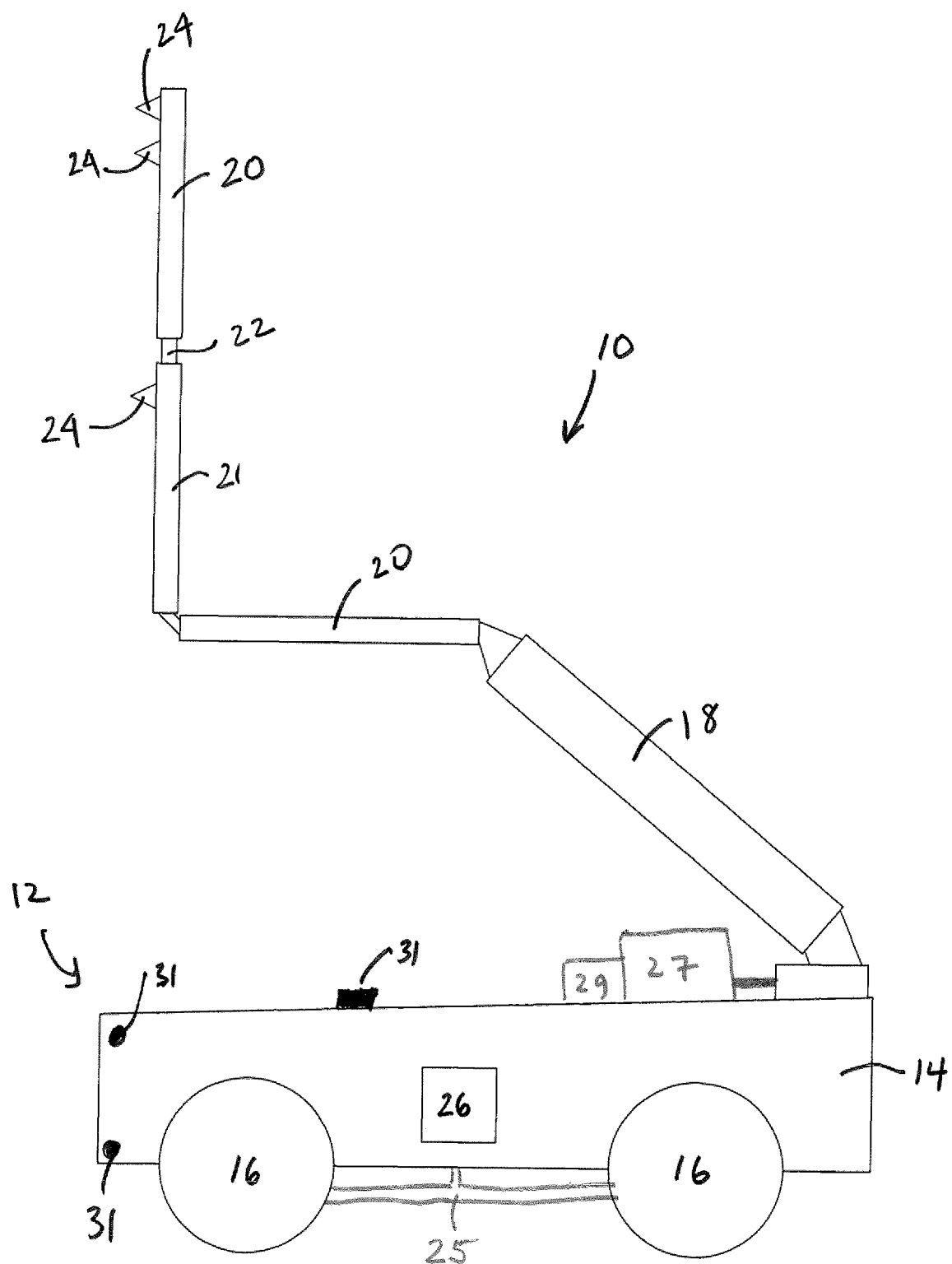
FIG. 1 is a schematic diagram of an apparatus for automated de-icing of an aircraft.

Turning to FIG. 1, a schematic diagram of a system for automated de-icing of an aircraft is shown. The system 10 includes a mobile platform 12, which itself includes a platform 14 and a set of wheels 16 mounted to the platform 14 allowing the system 10 to move from a starting location to a de-icing location. In a preferred embodiment, the wheels 16 are able to swivel or swerve with respect to the platform 14. This may be enabled by a swerve drive 25. More importantly, the swerving of the wheels can be performed when the system or apparatus 10 is in a stationary position.

In the current embodiment, mounted to the platform 14 is a crane arm portion 18. The crane arm portion 18 is mounted such that it can swivel or move with respect to the platform 14. De-icing spray arm portions 20 are mounted to the crane arm portion 18. Although three separate de-icing spray arm portions are shown in FIG. 1, it will be understood that the design of the spray arm portions 20 may be based on the requirements of the system 10. In a preferred embodiment, the system includes a system drivetrain to control the crane arm portion and the de-icing spray arm portions. In a preferred embodiment, the spray arm portions are electrically powered by a single battery. In another embodiment, the spray arm portions may telescope with respect to each other.

The integration of the spray arm portions 20 with each other and with the crane arm portion 18 is preferably via individual joints 22 that allow the spray arm portions 20 and the crane arm portion 18 to pivot with respect to each other. In FIG. 1, the apparatus is seen as being in one of many operational positions whereby the spray arm portions 20 are ready to deliver the de-icing fluid. Alternatively, the spray arm portions may deliver compressed gas to remove the contamination or a combination of de-icing fluid and compressed gas. The spray arms portions 20 further include a set of de-icing nozzles 24 that deliver the de-icing fluid (and/or compressed gas) to the aircraft. Each nozzle 24 is able to individually articulate in both the parallel and perpendicular axis' relative to the boom or spray arm portion. The apparatus 10 may also include a de-icing fluid delivery mechanism and storage 27. The mechanism and storage include pumps that assist in delivering the de-icing fluid or compressed gas to the spray arm portion 20 and the de-icing prays 24). In one embodiment, the pumps are electric diaphragm pumps. In the current embodiment, the system further includes a heating apparatus 29 to heat the de-icing fluid, however, this may be heated in another location and then placed into the storage 27 at a predetermined temperature that is maintained by the storage 27.

The apparatus 10 also includes a processor 26 that controls the apparatus 10. The processor 26 may be located, integrated or mounted anywhere within the apparatus, such as within or atop the wheeled platform 14 or within the crane arm portion 18. In the current embodiment, the processor 26 is located within the platform 14. The processor 26 is preferably protected from damage via a housing or by different components of the apparatus 10. The processor 26 preferably includes a communication module that allows it to communicate with external parties using a wireless communication protocol. The processor may also process messages or instructions that are received from the external party. The processor may also transmit information such as, but not limited to, apparatus state and current operational progress, reporting faults, incomplete operations, or uncompletable jobs. The system may also be able to determine the level of remaining fluid to determine when its reservoirs may need to be re-filled. The processor may also receive movement instructions, such as a path of motion or may receive control instructions from a joystick controlled by a remote user.

The apparatus may further include a set of sensors 31 that assist in determining safe operating conditions which may include wind speed, temperature and other environmental conditions. The set of sensors and cameras may further determine contamination levels.

Use of a swerve platform, whereby the wheels 16 can, for example, turn 90 degrees when in a stationary position, is novel to the de-icing industry and provides advantages that were not previously recognized. Also, by enabling the apparatus to move autonomously (or at least without a driver), the de-icing process may be performed without needing a human being to be present to manually control the mobile platform 12 and/or the spray arm portions 20 and the crane arm portion 18.

In a further embodiment, the apparatus includes components to communicate with the external party to transmit information so that the external party is able to coordinate a fleet of mobile de-icing machines to effectively address complex winter operational requirements. In one embodiment, each apparatus may include a Visual Indicating Process System (VIPS) that includes high intensity LEDs to communicate the operational status and mode of the mobile de-icing machine. Different colours indicate when the de-icing machine is safe to approach for ground personnel as well as the ability for a remote operator, using a camera system (described below), to interpret what a state that the de-icing machine is in which correlates to the a predetermined system. In one embodiment, the colours may be used in a following manner (although it will be understood that colours can be matched with other operation states and events).

| LED Colour | Operational State |
| --- | --- |
| OFF | De-icing machine off/powered down |
| ROTATING CAUTION AMBER LIGHT | Powered/In Operation |

| LED Colour | Event Status |
| --- | --- |
| YELLOW | Truck Safe |
| ORANGE | Spraying Type I Fluid |
| GREEN | Spraying Type IV Fluid |
| BLUE | Treatment Complete |

In a further embodiment, the apparatus may include functionality to self test in order to detect if it is operating efficiently and as intended. This self test may include all systems and subsystems aboard the mobile platform or apparatus. The built in self test (BIST) preferably runs upon startup, periodically throughout operation and when switching between operational modes and configurations. The mobile platform is also able to detect errors or failures as they occur during operations. The mobile platform will communicate these errors and alarms to the relevant external third parties.

Figure 2:
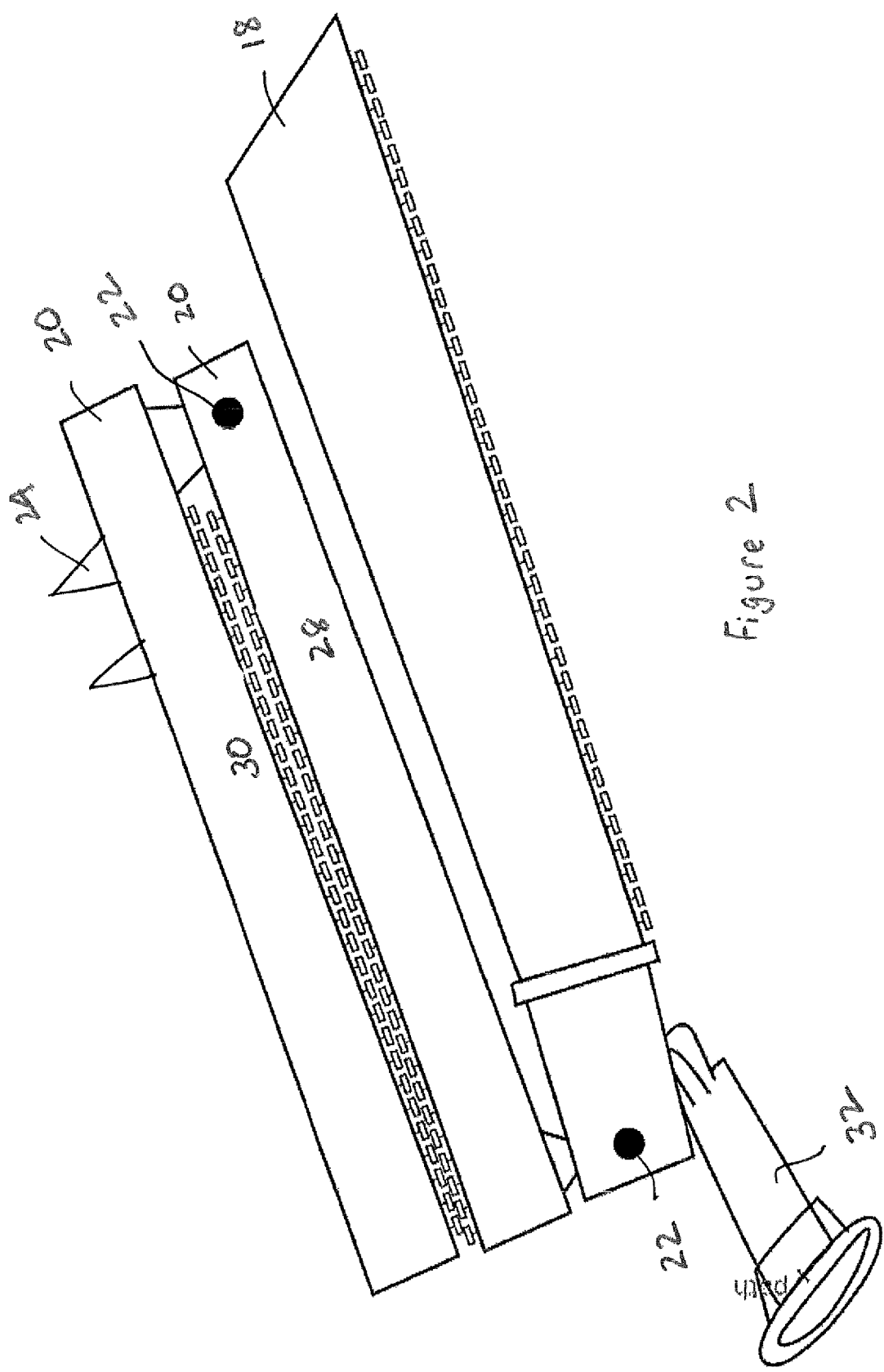
FIG. 2 is a schematic diagram of a crane arm portion and spray arm portions of the apparatus of FIG. 1.

Turning to FIG. 2, a schematic view of another embodiment of a crane arm portion 18 and de-icing spray portions 20 in a retracted position is shown. In the current embodiment, there are only two spray arm portions 20. As discussed above, the crane arm portion 18 is connected to one of the de-icing spray arm portions 20 via the pivot joint 22. In the current embodiment, the de-icing spray arm portions 20 includes a bottom spray arm portion 28 and a top spray arm portion 30 whereby the two spray arm portions 28 and 30 are connected by pivot joint 22. The pivot joints 22 enable the apparatus to move from this retracted position to one of the operational positions such as the position schematically shown in FIG. 1. The apparatus may further include an ice blaster spray 32 that is dedicated to de-icing areas that are typically harder to de-ice with the de-icing sprays 24. In the current embodiment, the bottom spray arm portion 28 may be seen as an ice blade de-icing portion while the top spray arm portion 30 may be seen as an ice hammer de-icing portion which is used for the fuselage of the aircraft. The ice blade de-icing portion may be used to scrape excess ice off the fuselage of the aircraft while the ice hammer de-icing portion may be used to break off larger ice build-up on the fuselage of the aircraft.

Figure 3A:
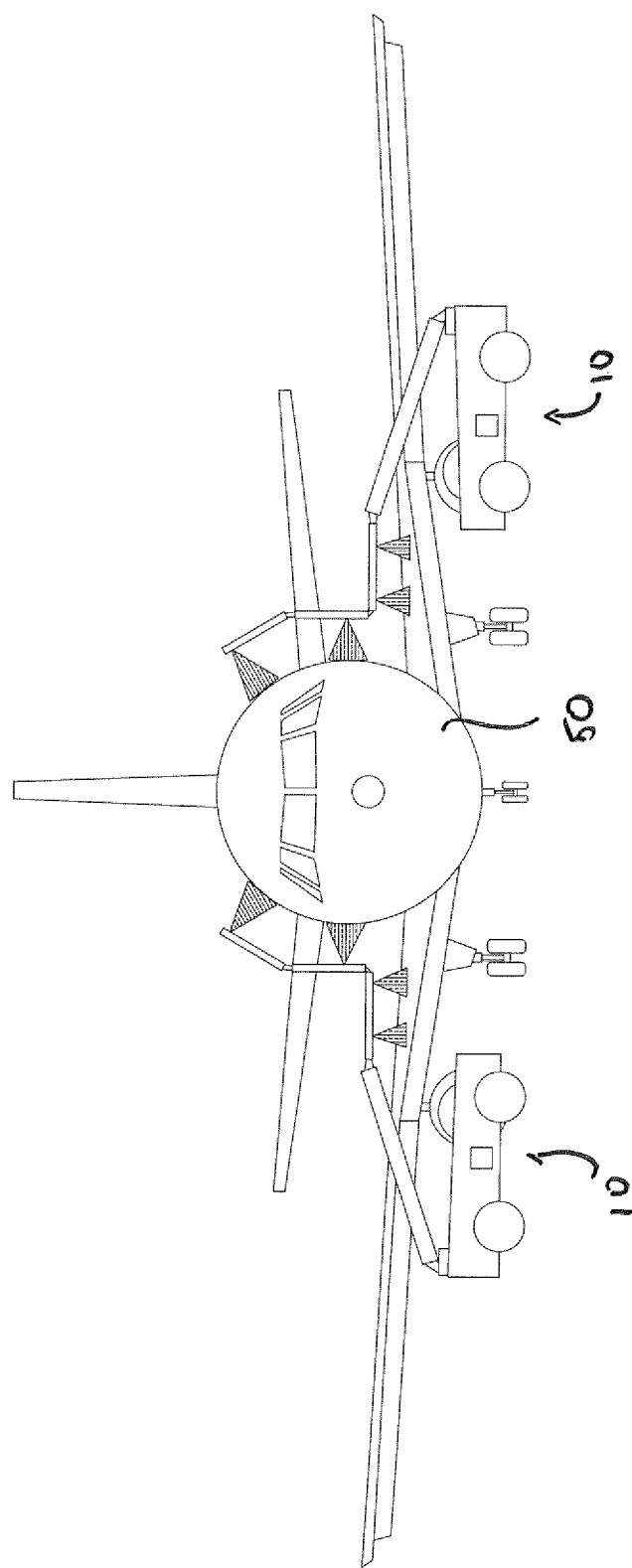
FIG. 3a is a schematic view of a system for automated de-icing of an aircraft.

Turning to FIG. 3a, a schematic front view of a system for automated de-icing of an aircraft is shown. In the current embodiment, the system includes a pair of apparatus 10 for performing the automated de-icing of an aircraft 50 whereby each of the apparatus 10 de-ice one side of an aircraft 50.

In operation, each of the apparatus 10 preferably receive instructions from an external party or a remote controller such as a joystick controlled by de-icing personnel. These instructions may include a location (or the de-icing location) of the aircraft to be de-iced within an airport (such as global positioning system (GPS) co-ordinates), the type of aircraft being de-iced and the type of de-icing required. The type of de-icing required may include locations on the aircraft that require de-icing or the type of de-icing liquid or liquids required for de-icing of the aircraft or both. Other de-icing information may also be transmitted as will be understood by one skilled in the art.

It is assumed that each of the apparatus 10 may be located anywhere in the airport (the starting location), such as in a different hanger or a different de-icing facility but that this starting location is known by the external party. Alternatively, each apparatus 10 may be located in the same de-icing facility but may be located within another aircraft bay. By having mobile de-icing apparatus 10, less equipment may be required since one mobile de-icing machine may be able to service multiple aircraft bays as compared to some current systems where each aircraft de-icing bay has its own, static, de-icing equipment and is generally operated by on-site de-icing personnel.

After receiving the instructions, the apparatus 10 travel through the airport from the starting location to the de-icing location or the location of the aircraft that it has been instructed to de-ice. During travel, the crane arm portion 18 and the spray arm portions 20 are preferably to be in the retracted position. After reaching the de-icing location, the crane arm portion 18 and the spray arm portions 20 move from the retracted position to an operational position such as schematically shown in FIG. 3a. Operational positions of the spray arm portions are preferably determined by the instructions received from the external party and may change during the decontamination removal treatment.

The apparatus 10 may then start the de-icing process based on the instructions received. As the instructions preferably include the type of aircraft being serviced, based on the de-icing location information and the type of aircraft information, each apparatus 10 travels the circumference or outline of the aircraft along one side of the aircraft applying or spraying the de-icing fluid (and/or compressed gas). In some cases, motion of the mobile platform may be continuous and in some cases, the mobile platform may stop so that the extended de-icing or contamination removal may be performed. As shown in FIG. 3a, the apparatus are spraying, or applying de-icing fluid, to each side of the body of the aircraft 50.

As the de-icing fluid is sprayed on to the aircraft 50, the apparatus moves adjacent the aircraft such as from the front to the rear of the aircraft. In order to enable lateral movement of the apparatus, the wheeled platform preferably includes rotating wheels, such as enabled by a swerve drive. While each apparatus moves alongside the aircraft 50, the crane arm portion 18 and the spray arm portions 20 may also move accordingly based on the instructions received as the mobile platform travels the outline of the aircraft.

Figure 3B:
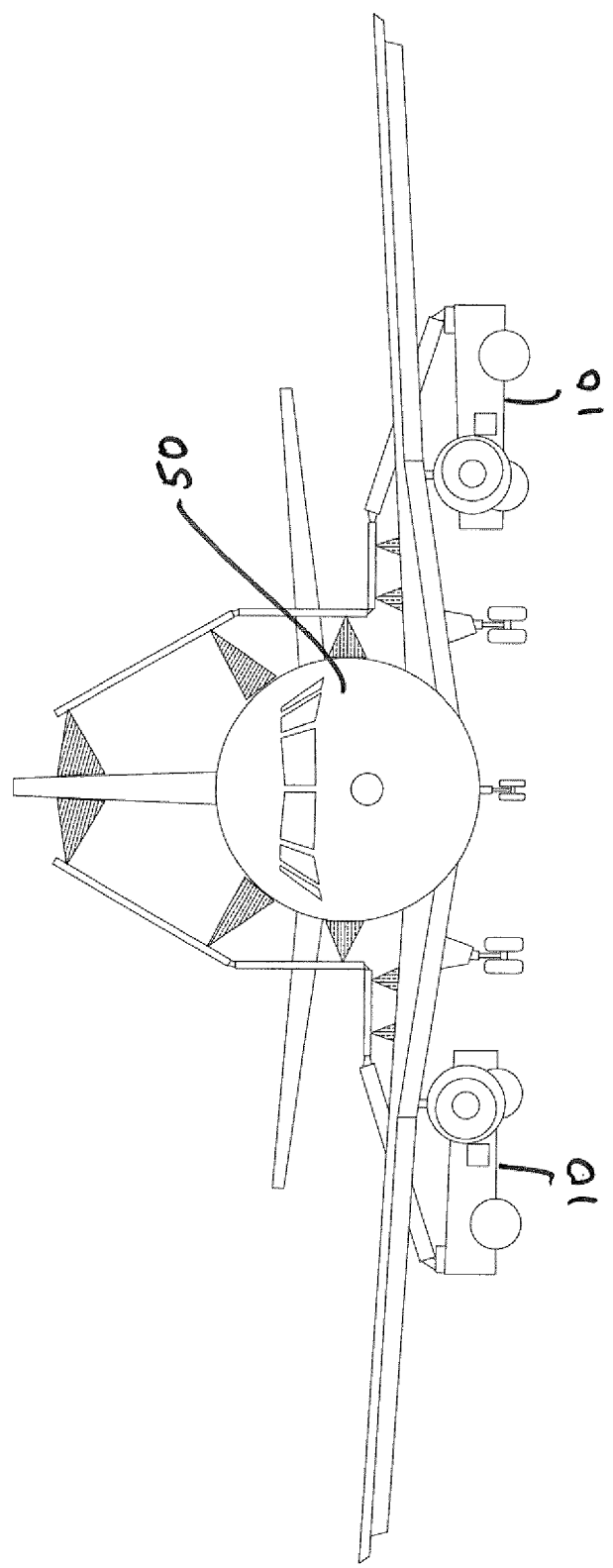
FIG. 3b is another schematic view of a system for automated de-icing of an aircraft.

Turning to FIG. 3b, another schematic front view of a system for automated de-icing of an aircraft is shown. As can be seen in this figure, the spray arm portions 20 are in another operational position whereby the fuselage and the tail of the aircraft 50 is being de-iced. The position of the spray arm portions 20 is controlled by the processor 26 via the instructions supplied to it by the external party. Movement of the spray arm portions 20 and the crane arm portion 18 are preferably controlled by the processor 26. In a preferred embodiment, movement of the mobile platform 14 and swerve drive 25 is also controlled by the processor 26. Although not shown, it would be understood that different safety measures may also be implemented, such as, but not limited to, Light Detection and Ranging (LI DAR) in order to reduce the likelihood of collisions or accidents involving the apparatus. Other safety measures associated with self-driving automobiles are also contemplated.

For some de-icing operations, as they may require the combined efforts of multiple mobile de-icing machines to complete the operation, such as schematically shown in FIGS. 3a and 3b, the mobile de-icing machines may be assigned different portions of the operation either individually or as a group. The de-icing process may be broken into parts; such as a mobile de-icing machine or a group of mobile de-icing machines may be assigned a particular area of the aircraft (e.g. left wing) or a mobile dse-icing machine could be assigned to apply a specific fluid type or a de-icing fluid at a specific temperature or a specific concentration. Each mobile de-icing machine also be assigned to a "standby" mode, ready to take the place of another mobile de-icing machine in a "hot swap" fashion, should the need arise due to fluid refilling needs or unexpected maintenance.

Each apparatus 10 preferably has the functionality to communicate with other apparatus 10 to share information and reach consensus on environmental and operating conditions. Sharing meteorological data (collected both on and off the platform) the mobile platform has the ability to determine if the environmental conditions are safe for de-icing operations. (e.g. windspeed to determine if it is safe to extend the boom).

In a preferred embodiment, the external party has the ability to issue a stop command, immediately halting all current operations and entering a "safe mode". In this safe mode, all positions of the wheels, booms, sprays and other moving pieces of the apparatus 10 are immediately suspended and held. If any portion of the apparatus is moving at the time a stop command is issued, it will immediately, within the constraints of predefined velocities, come to a stop and hold the position. Also, each apparatus 10 preferably has the functionality to issue a stop command should they detect unintended physical contact with the aircraft, other mobile platforms, obstacles or itself (e.g. boom hitting body). Other apparatus working in coordination with the apparatus that raised the stop command shall also abide to the stop command until a third party has corrected the fault or deemed the situation safe for continued operation.

Figure 4A:
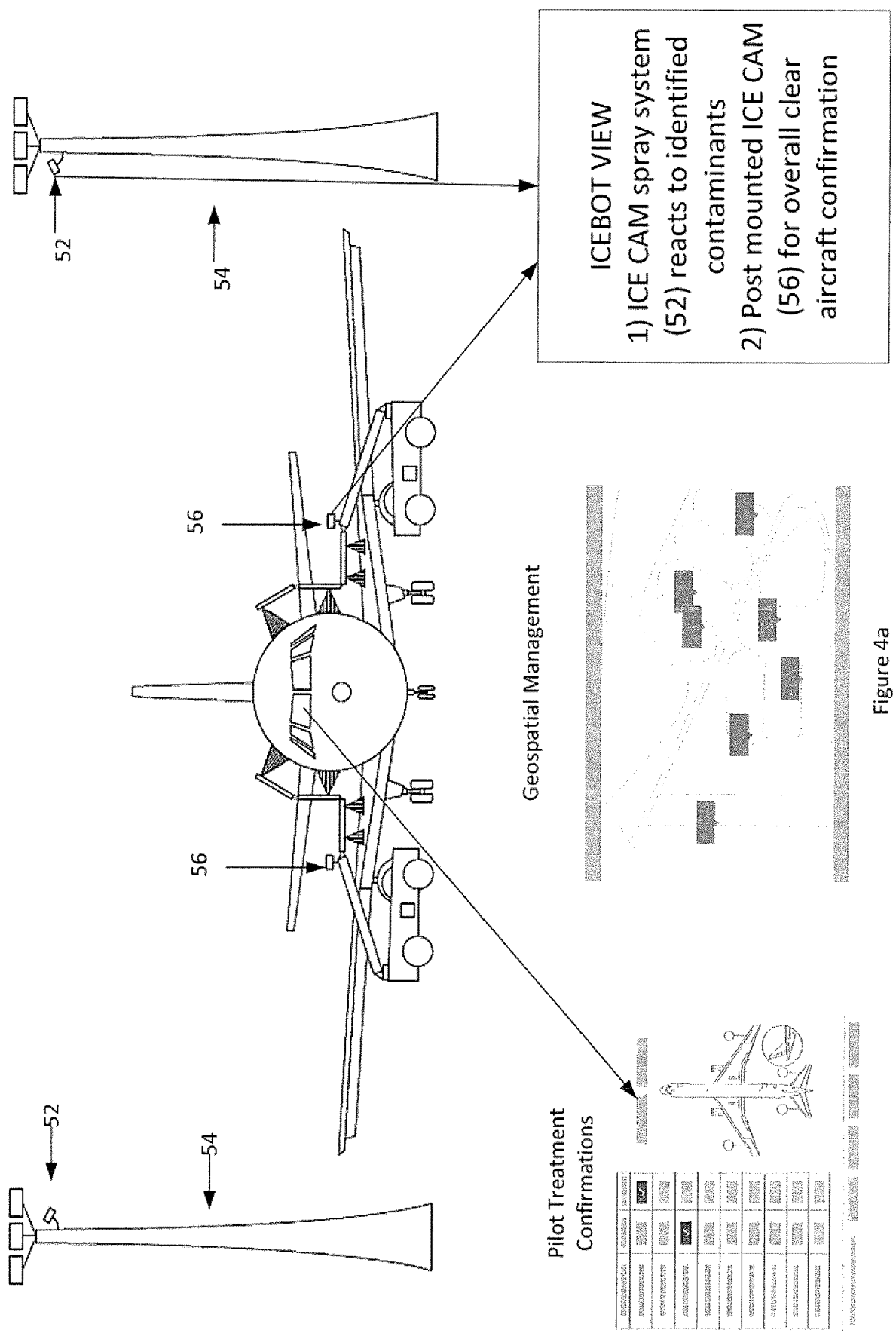

Turning to FIG. 4a, another schematic front view of a system for automated de-icing of an aircraft is shown. In the current embodiment, along with the apparatus 10 that are used to de-ice the aircraft 50, the system may further include a set of cameras that are used to assist in monitoring the de-icing process. One set of cameras 52 may be mounted to poles 54 remote from the aircraft in locations where they are able to capture perspective views of the aircraft. As shown, the cameras 52 are directed at the body of the aircraft to capture images of the aircraft body during the de-icing process. In one embodiment, the set of cameras 52 may be obtaining thermal images. The images captured by these cameras 52 may be used by an individual to confirm that adequate de-icing has been completed by the apparatus 10 or may be used to issue further de-icing instructions for areas that require further de-icing or contamination removal.

The system may include a further set of cameras 56, such as ones mounted to the apparatus 10, to obtain images of the aircraft body. These images, such as schematically shown in FIG. 4a and labelled as Icebot view, may be transmitted to predetermined personnel. It will be understood that in some embodiments, only one of the sets of cameras may be used. Any of the images captured by either set of cameras may be transmitted to predetermined personnel. The images may be transmitted from the cameras to the pilots or a remote display for viewing by the predetermined personnel. Based on these images, the pilots may be given the go-ahead to proceed to a runway or the apparatus may be instructed to do some further de-icing.

As shown in the bottom of FIG. 4a, the images may be delivered to the pilot such that the pilot may also provide treatment confirmations or that the pilot is content with the performance of the de-icing apparatus. Alternatively, the pilot treatment confirmations may also be requests from the pilot for de-icing and may form part of the instructions that are delivered to the apparatus 10 by the external party. By understanding the locations of each of the apparatus under its control, a main control system may be able to provide an overview or geospatial management screen so that the location of each of the apparatus may be monitored.

FIG. 4b is another schematic front view of a system for automated de-icing of an aircraft whereby the apparatus are de-icing the tail of the aircraft. FIG. 4c is a view similar to FIG. 4a with the geospatial view replaced by an operational control interface. In a preferred embodiment, control of the apparatus is preferably via a de-icing control management system, which may also be seen as the external party.

Figure 5A:
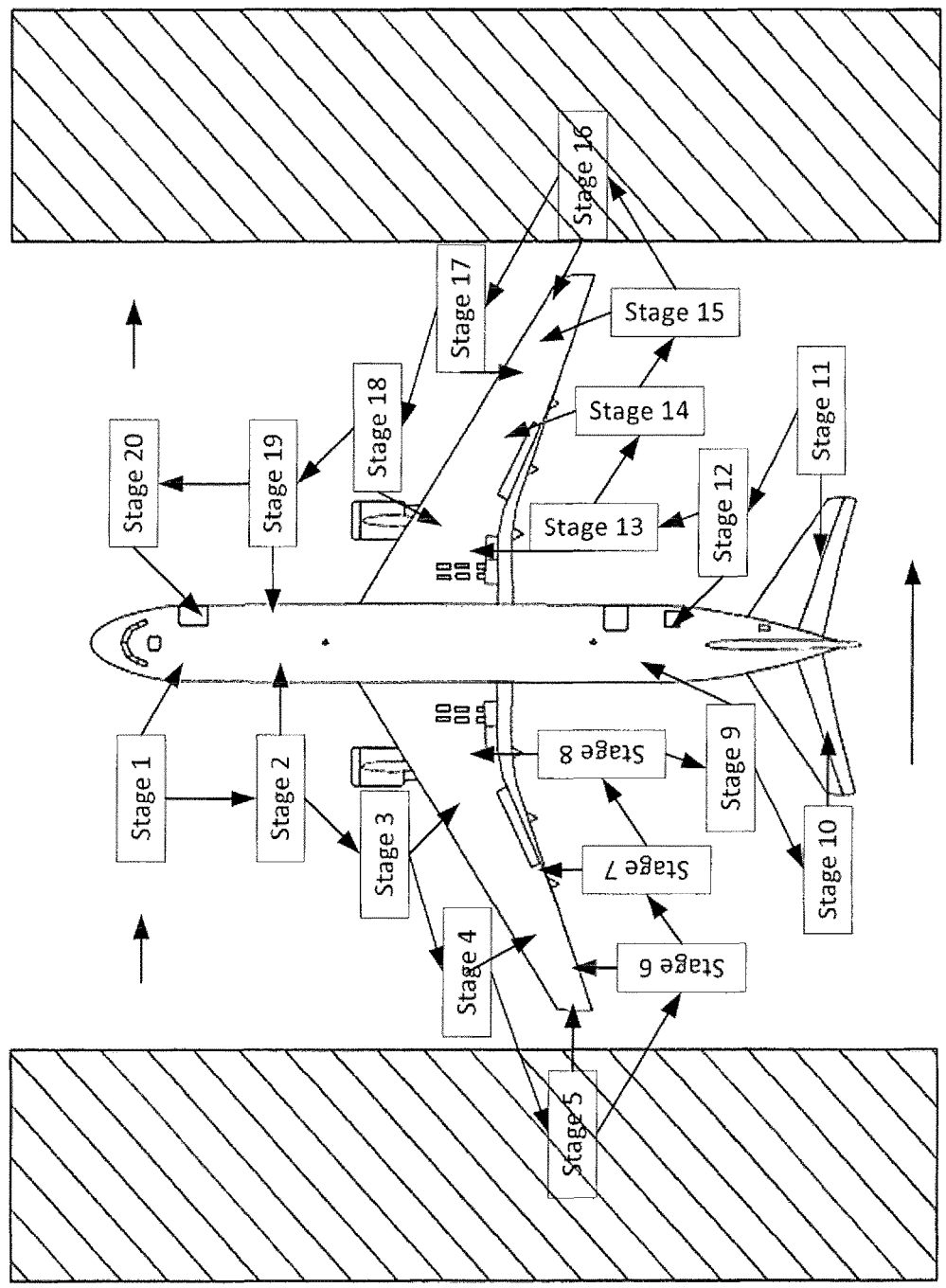
FIGS. 5a, 5b and 5c are top views of a stages for a single apparatus system for automated de-icing of an aircraft.
Figure 5B:
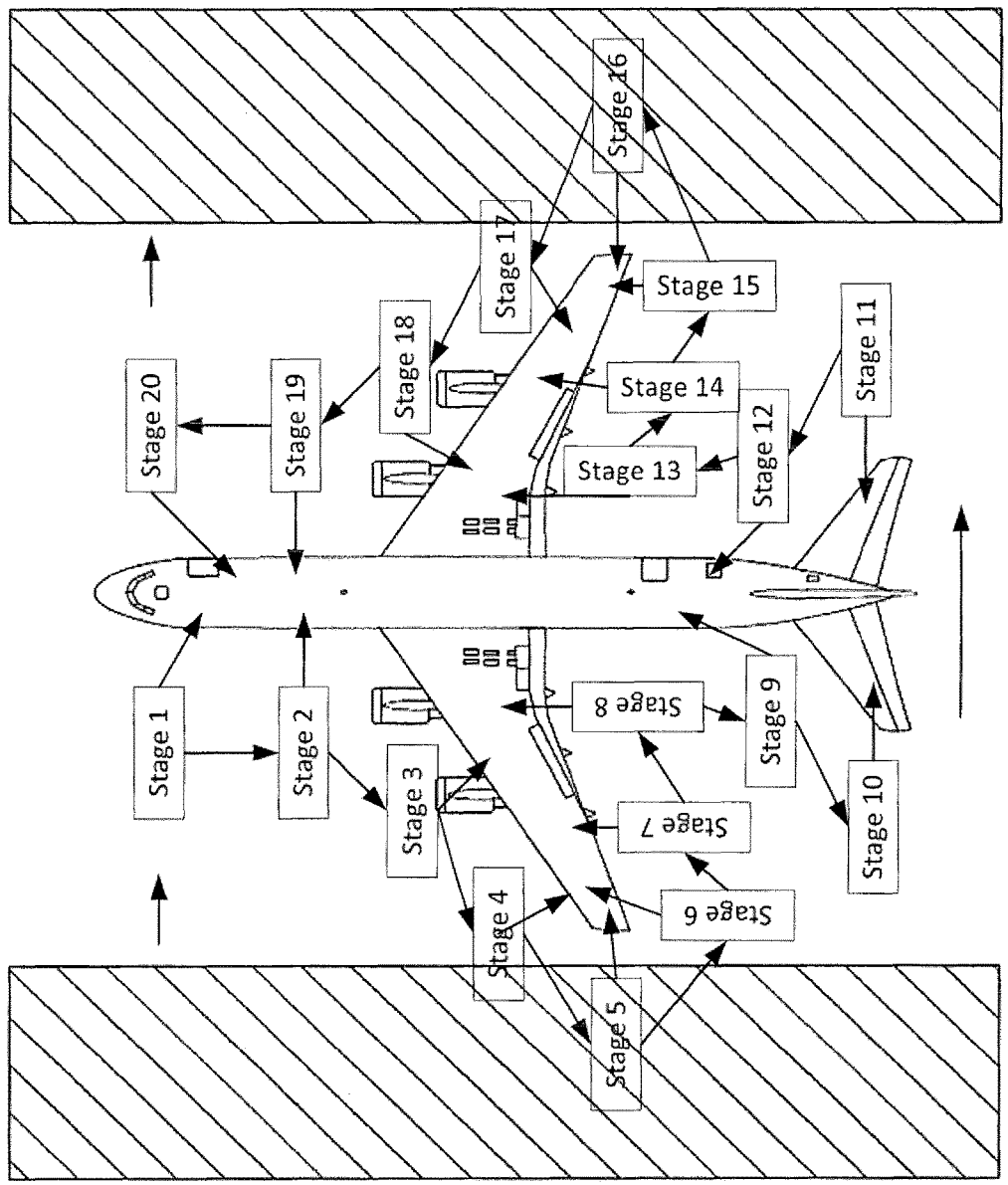
Figure 5C:
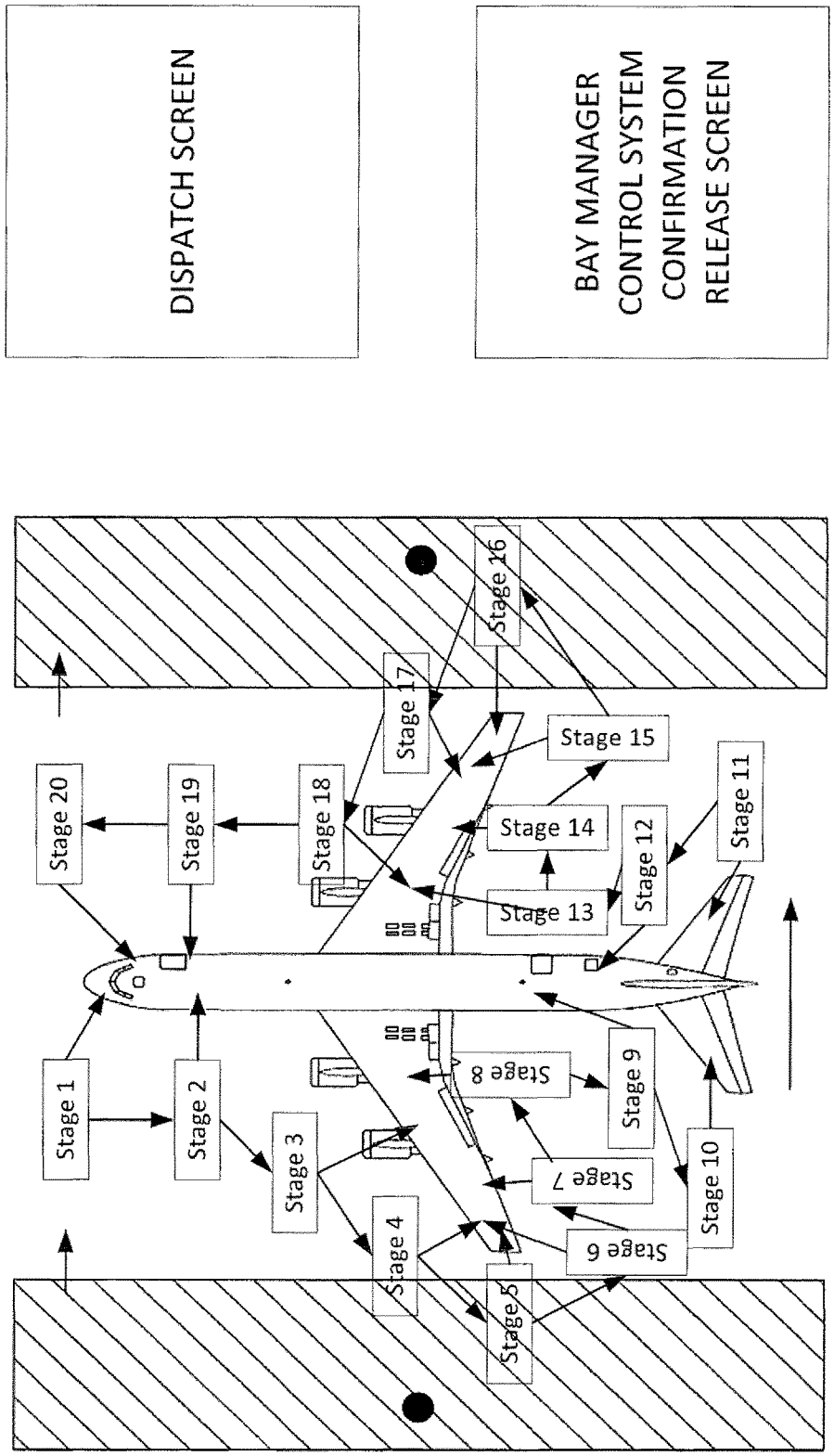

Turning to FIGS. 5a and 5b, schematic views of a single apparatus system is shown. FIG. 5a is a top view of the action of the single apparatus with respect to a Boeing 777 aircraft. As shown in FIG. 5a, one embodiment of the stages where the single apparatus may stop in order to de-ice the aircraft are shown. In this embodiment, the apparatus 10 stops in twenty stages around the circumference of the aircraft in order to apply or spray the de-icing fluid based on the instructions from the external party, however the number of stages and location of stages may be different. In one embodiment, the apparatus follows in the directions of the arrows although it will be understood that the apparatus may travel in the opposite direction of the arrows. FIG. 5b shows a top view of the action of the single apparatus system with respect to a Boeing 747. FIG. 5c provides a similar top view along with screens that may be displayed to personnel based on information delivered by the apparatus.

Figure 6:
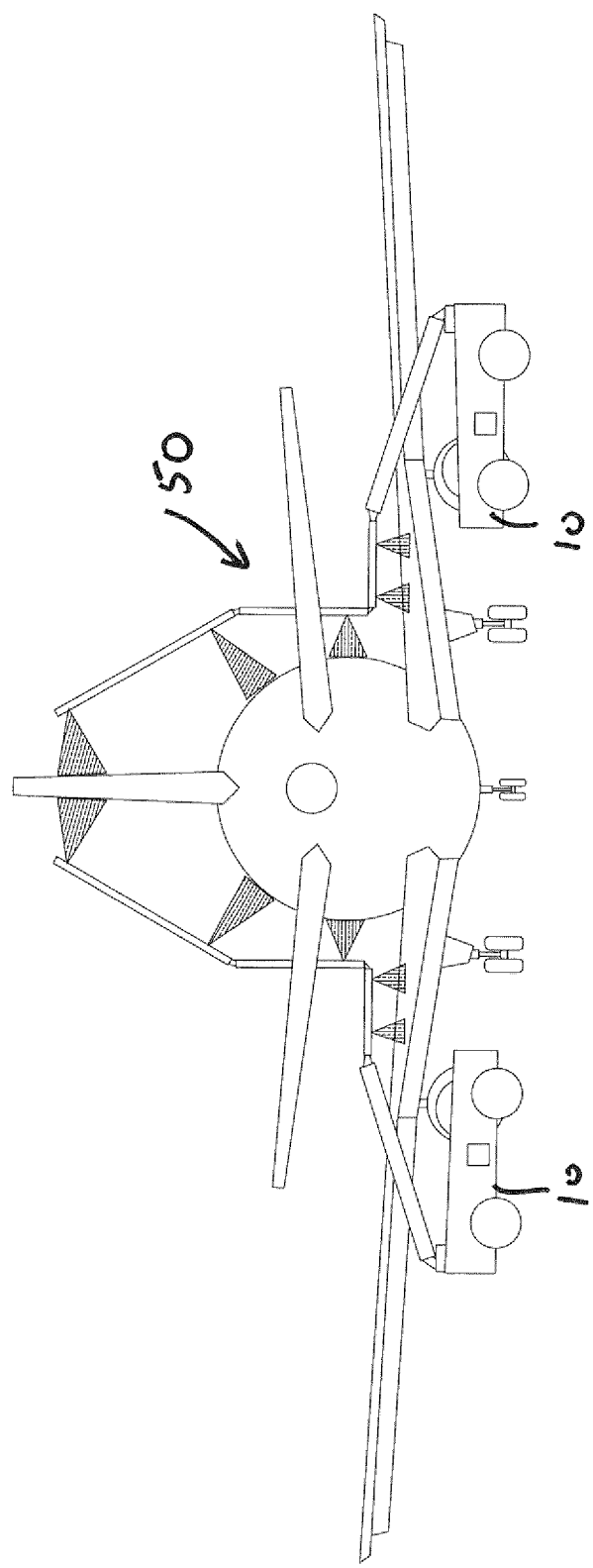
FIG. 6 is another schematic diagram of an embodiment of apparatus for automated de-icing of an aircraft.

Turning to FIG. 6, another schematic diagram of the apparatus is shown.

In an alternative embodiment, the mobile platform supports 60000 lbs, includes safety measures such as ground collision avoidance, is able to receive a set of Latitude and Longitude measurements and co-ordinates and be able to track straight line vectors between points while maintaining platform X, Y attitude such that the platform does not rotate while traversing a vector segment, define low and high speeds and be able to be remotely controlled.

The spray arm portions are preferably able to communicate with the processor to indicate possible incursion/collisions to enable corrections in direction of travel of the platform or apparatus. The processor preferably includes the functionality to determine fuel capacity—battery and diesel. The apparatus is preferably able to store type 1 and type 4 fluid tanks. The apparatus is also preferably able to provide operational power for a predetermined time frame, such as eight hours.

Some technical requirements for the spray arm portions may include that its power requirement be electric and hydraulic. In the preferred embodiment, the spray arm portions, or the crane arm portion, are bolted to the platform although other fastening methods are contemplated. The spray arm portions preferably include an articulating arm that can extend, retract and/or move vertically. Furthermore, the spray arm portions preferably include an articulating hand on the terminus that houses pre- and post-fluid application analysis sensor packages, fluid and air application nozzles. The apparatus may further include sensors that measure flow rates, temperatures and densities of fluids. In the preferred embodiment, the fluids are applied autonomously.

Overall control of the apparatus preferably includes computer system or modules that runs the chassis drives and sensors of the wheeled platform; implement controls for the spray arm portions; and combine central intelligence for overall command and control that coordinates the apparatus.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A system for automated de-icing of an aircraft comprising:
   a mobile platform, the mobile platform including a set of wheels and a swerve drive for controlling movement of the set of wheels;
   a contamination removal apparatus mounted to the mobile platform for delivering contamination removal treatment to the aircraft; and
   a processor for receiving instructions associated with the contamination removal treatment from an external party and for controlling the mobile platform and contamination removal apparatus to deliver the contamination removal treatment;
   wherein the contamination removal apparatus includes a crane arm portion and at least one spray arm portion; and
   wherein each of the at least one spray arm portions includes an upper spray arm portion pivotally connected to a lower spray arm portion.

2. The system of claim 1 wherein the crane arm portion is mounted to the mobile platform and the at least one spray arm portion is pivotally connected to the crane arm portion.

3. The system of claim 1 wherein each of the upper spray arm portion and the lower spray arm portion comprise nozzles to deliver de-icing fluid or compressed gas to the aircraft.

4. The system of claim 3 wherein each nozzle individually articulates in axes parallel and perpendicular to the spray arm portion to which it is attached.

5. The system of claim 1 further comprising a set of sensors for determining environmental conditions and for communicating the environmental conditions to the processor.

6. The system of claim 1 further comprising a set of LEDs for indicating operational status and/or event status of the system.

7. The system of claim 1 further comprising a set of cameras.

8. A system for automated de-icing of an aircraft comprising:
   a mobile platform, the mobile platform including a set of wheels and a swerve drive for controlling movement of the set of wheels;
   a contamination removal apparatus mounted to the mobile platform for delivering contamination removal treatment to the aircraft; and
   a processor for receiving instructions associated with the contamination removal treatment and for controlling the mobile platform and contamination removal apparatus to deliver the contamination removal treatment;
   wherein the contamination removal apparatus includes a crane arm portion and at least one spray arm portion; and
   wherein each of the at least one spray arm portions includes an ice hammer de-icing portion pivotally connected to an ice blade de-icing portion.

9. The system of claim 8 wherein the crane arm portion is mounted to the mobile platform and the at least one spray arm portion is pivotally connected to the crane arm portion.

10. The system of claim 8 wherein each of the ice hammer de-icing portion and the ice blade de-icing portion comprise nozzles to deliver de-icing fluid or compressed gas to the aircraft.

11. The system of claim 10 wherein each nozzle individually articulates in axes parallel and perpendicular to the spray arm portion to which it is attached.

12. The system of claim 8 further comprising a set of sensors for determining environmental conditions and for communicating the environmental conditions to the processor.

13. The system of claim 8 further comprising a set of LEDs for indicating operational status and/or event status of the system.

14. The system of claim 8 further comprising a set of cameras.

* * * * *